Figure 1:
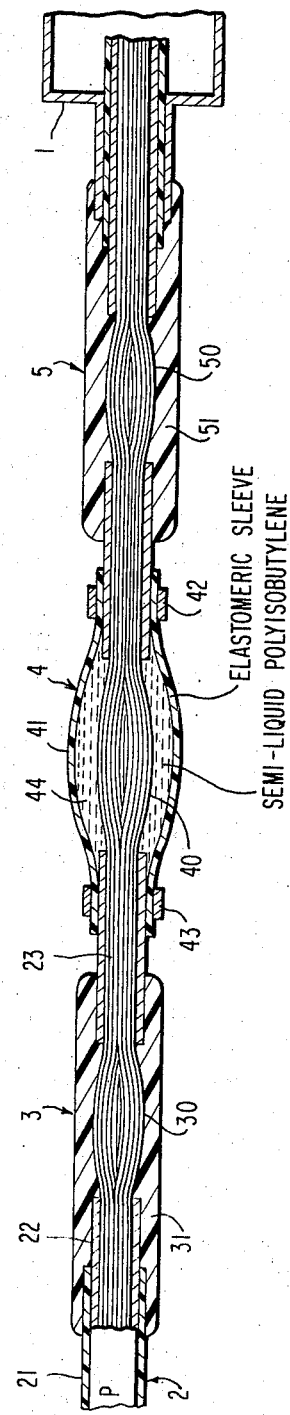

United States Patent [19]
Rocton

[11] 3,872,233
[45] Mar. 18, 1975

[54] SEALED CONNECTION DEVICE FOR A CABLE

[75] Inventor: Lucien Rocton, Malakoff, France

[73] Assignee: Compagnie Industrielle Des Telecommunications CIT-ALCATEL, Paris, France

[22] Filed: Nov. 14, 1973

[21] Appl. No.: 415,795

[30] Foreign Application Priority Data
Nov. 14, 1972 France .............................. 72.40314

[52] U.S. Cl. ............................. 174/23 R, 174/70 S
[51] Int. Cl. ............................................ H02g 15/00
[58] Field of Search ........ 174/20, 21 R, 22 R, 23 R, 174/23 C, 70 S, 76; 156/48

[56] References Cited
UNITED STATES PATENTS
1,762,255  6/1930  Baldwin ........................ 174/23 R X
2,168,757  8/1939  Baillard et al. .................... 174/23 R
3,728,466  4/1973  Rocton et al. .................... 174/23 R FOREIGN PATENTS OR APPLICATIONS
17,235   7/1969  Japan ............................... 174/23 R
165,104  10/1958 Sweden ............................ 174/23 R Primary Examiner—Laramie E. Askin
Attorney, Agent, or Firm—Craig & Antonelli

[57] ABSTRACT

Sealed connection device for a cable under gaseous pressure, comprising an elastomeric sleeve, connected with an internal tubular part, surrounding a bared zone of the cable and subjected to the pressure of a viscous liquid which is higher than the gaseous pressure of the cable.

9 Claims, 2 Drawing Figures

SEALED CONNECTION DEVICE FOR A CABLE

The present invention comes within the field of cables for telecommunication equipment, of the gaseous pressure type. It concerns, more particularly, a sealed connection device for a cable under gaseous pressure at the input of an equipment box to be protected from the pressure.

In telecommunication connections, there are numerous equipment elements, for example, repeaters, pulse regenerators, inserted at regular intervals in the connections. These equipment elements are placed in boxes. It is necessary for these elements to be sheltered from atmospheric dampness and also from the gaseous pressure prevailing in the cable, when they are not dimensioned to withstand that pressure.

It is a known practice, when the cables are not under gaseous pressure, to protect the box from the atmospheric air by means of a stopper enclosing the cable at the level of each of the two accesses of the box, so that damp air or water cannot enter the box (in the case of a defect in the covering of the cable, for example).

That stopper is, for example, formed by a sleeve made of resin such as that known by the designation "epoxy." It may, moreover, comprise an intermediate flexible sleeve, formed, to great advantage, by a neutral chemical paste composed by a mixture of polyethylene and polyisobutylene, that intermediate flexible sleeve being, with the conductors, enclosed in the sleeve made of resin.

In the aforementioned example, the type of stopper described ensures good sealing with respect to the outside air or water for the connection of a box on the cable; nevertheless, it is no longer sufficient, in the case where that box is, moreover, to be protected from a gaseous pressure prevailing in the cable.

The present invention aims at enabling a good sealed connection in the case where the cable is under gaseous pressure.

The present invention has, for its object, a sealed connection device for a cable under gaseous pressure, in which the covering of the cable, enclosing a harness of electrically insulated conductors, is subjected to the pressure of an inert internal gas, characterized in that it comprises a first sleeve made of an elastomeric substance closely bound to the said cable, surrounding a first bared zone of the cable and filled with a viscous chemically neutral liquid, in contact with the conductors, subjecting it to an internal pressure greater than the gaseous pressure prevailing in the cable.

Other characteristics and the advantages of the present invention will become apparent from the description given herebelow with reference to the accompanying drawings, in which:

FIG. 1 is a longitudinal cutaway view of a cable under gaseous pressure comprising the sealed connection device according to the invention. That figure gives the principle used for stopping the gaseous pressure of the cable; and FIG. 2 is a partly cuataway perspective view of an example of embodiment of that connection device.

Figure 2:
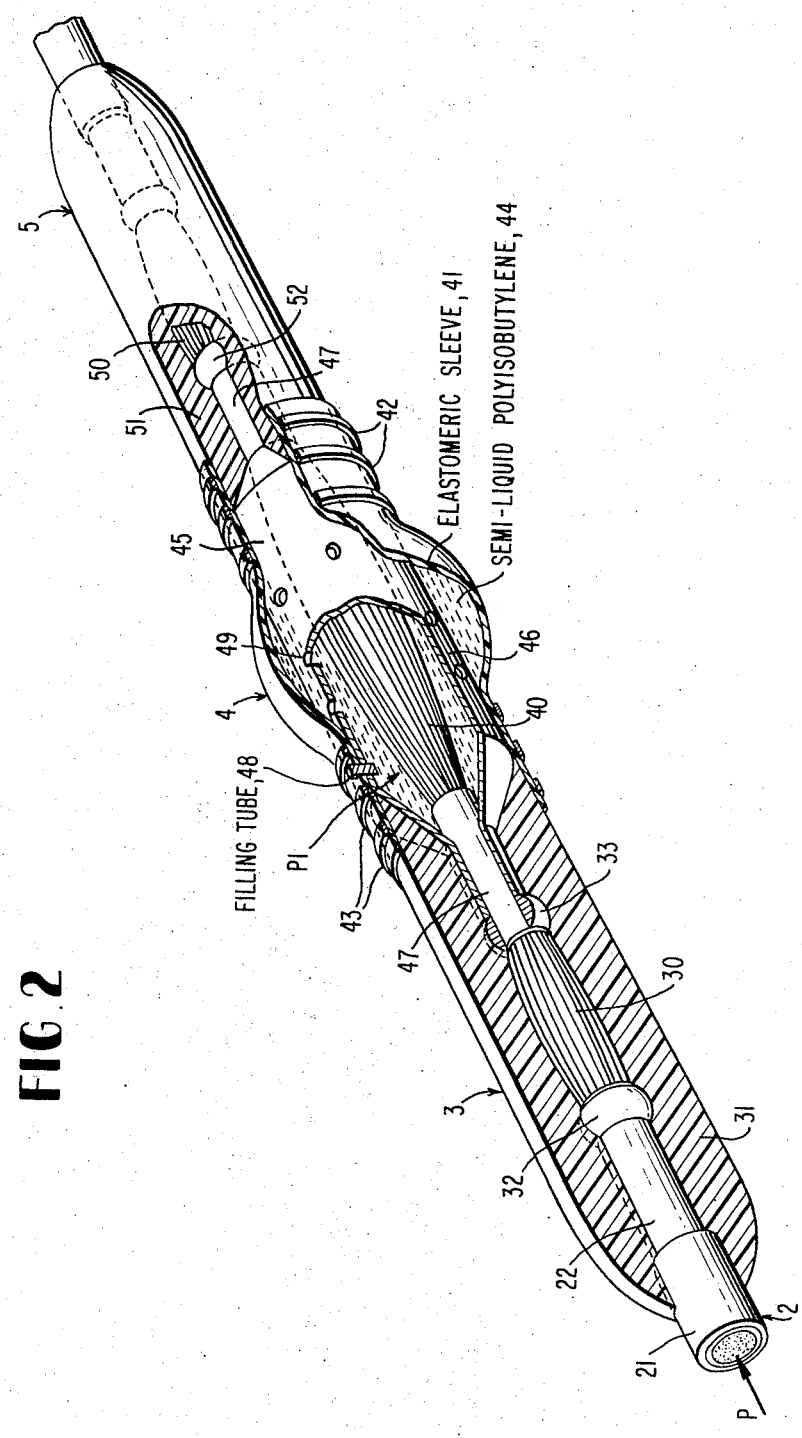

In these two figures, although FIG. 1 corresponds to a diagrammatic illustration whereas FIG. 2 corresponds to an embodiment, the same reference numerals are used to designate the same elements. The equipment box to be protected shown exclusively in FIG. 1 is designated by reference numeral 1. The cable under the gaseous pressure P is designated by the general reference numeral 2. The box 1 is to be protected both from the outside air and from the gaseous pressure P of the cable, that pressure prevailing in the cable on either side of the connection device.

The cable 2 comprises, within a covering 21 made of a plastic substance, a lead covering 22 enclosing a harness of telephonic quads 23.

The sealed device connecting the cable 2 to the box 1 comprises, to great advantage, a first and second stopper 3 and 5 of known type and a third stopper 4 arranged between the first and second stoppers 3 and 5 to ensure the protection of the box from the gaseous pressure of the cable. Throughout the length of that connection device, with the exception of the input and output of the cable of the connection device, the covering 21 made of a plastic substance has been cut.

The stoppers 3, 4, and 5 cover the successive bared zones of the cable 2. These zones are referenced 30, 40, 50. The corresponding portions of the lead covering 22 have been cut, thus leaving the quads 23 bare.

The stopper 3 is constituted by a sleeve 31 made of a resin such as that known by the designation "epoxy." That sleeve may be formed by moulding. It encloses the guads 23, extending beyond the bared zone 30 on either side, onto the edges of the uncut portions of lead covering 22.

The stopper 5 is the same as the stopper 3. It is constituted by a sleeve 51 made of resin formed and arranged on the zone 50 in an identical way to the stopper 3 covering the zone 30.

FIG. 2 shows that, in each of the bared zones 30 and 50, synthetic rubber rings enclosing a putty-like substance are arranged between the edges of the lead covering 22 and the harness of quads. Those rings are shown at 32 and 33 for the zone 30. Only the ring 52 of the zone 50 is visible here. The putty-like substance is intended to resist any migration of the epoxy resin during the moulding thereof, towards the cable and the zone 40.

According to FIGS. 1 and 2, the stopper 4, arranged between the two stoppers 3 and 5, comprises a sleeve 41 made of an elastomeric substance "fixed" onto the cable 2 by means of hoops such as 42 and 43. That sleeve covers the bared zone 40 of the quads and overlaps onto the edges of the portions of the lead covering 22 limiting that zone. That stopper 4 comprises, moreover, a semi-liquid compound 44 under a pressure $P_1$, filling the sleeve 41. That semi-liquid compound is chemically neutral. It is, to great advantage, formed by polyisobutylene. The pressure $P_1$ prevailing in the sleeve 41 will be selected to be greater than the gaseous pressure P prevailing in the cable upstream from the connection device. The result will be, for example, $P_1 = 1.5\,P$.

According to the embodiment shown in FIG. 2, it will be seen that the stopper 4 cooperates with the stoppers 3 and 5. The sleeve 41 covers the adjacent edges of the stoppers 3 and 5.

A tubular metallic part 45, whose central portion 46 is enlarged throughout the length of the bared quads and whose ends such as 47 are welded on the uncut portions of the lead covering 22, is arranged inside the sleeve 41. The hoops 42 and 43 ensure the fixing of the sleeve 41 or its mechanical connection with the tubular part 45 and the fixing of the sleeve 41 respectively on the sleeves 31 and 51 of two adjacent stoppers 3 and 5. Tubes such as 48 passing through the sleeve 41 and the tubular part 45 enable the injecting of the semi-liquid compound 44 inside the tubular part in its enlarged portion. The orifices such as 49 provided in the metallic part 45, between the hoops such as 42 and such as 43, form passages for that semi-liquid compound, which is inserted between the sleeve and the metallic part 45 and expands, as illustrated, the central portion of the elastomeric sleeve 41. The inside of the sleeve 41 is thus subjected to a pressure $P_1$ of semi-liquid compound forming a practically perfect stop for the gaseous pressure P prevailing in the cable ($P_1 > P$). The tubular part 45 gives excellent mechanical resistance to the stopper 4.

The connection device described above is, moreover, enclosed in an outer protection, not shown, constituted, to great advantage, by a thermo-retractable sleeve made of polyolefin, for example.

The embodiment shown in FIG. 2 has been given by way of an example. It is evident that, without going beyond the scope of the present invention, it is possible to make a few modifications in detail thereto and/or to replace certain means by other technically equivalent means. More particularly, it should be observed that the stoppers 3 and 5 cooperating in a way constituting an advantage, with the stopper 4 under the pressure $P_1$ of viscous liquid ($P_1 > P$) are not indispensable. In the case where such stoppers 3 and 5 are connected with the stopper 4, they can be of any known type. They can also contain a paste mixture such as a paste consisting basically of polyethylene and of polyisobutylene.

What is claimed is:

1. A sealed connection device for a cable under gaseous pressure, said cable including covering means enclosing a harness of electrically insulated conductors subjected to the pressure of an inert internal gas, said sealed connection device comprising:
   sleeve means enclosing a bared zone of the conductor harness of the cable, said sleeve means including an outer covering of an elastomeric substance,
   a viscous chemically neutral liquid contained inside said sleeve means in contact with the conductors, said viscous liquid being under a pressure greater than the gaseous pressure in the cable, and
   sealing means sealing the ends of said sleeve means onto the cable.

2. A sealed connection device according to claim 1, characterized in that the said viscous liquid is formed by a polyisobutylene.

3. A sealed connection device according to claim 1, characterized in that said sleeve means further comprises a tubular metallic part disposed inside the elastomeric outer covering, the ends of said metallic part being made fast in a sealed manner with said cable and having an enlarged middle portion which has passages for said viscous liquid.

4. A sealed connection device according to claim 3, wherein said sealing means include a plurality of bands surrounding the ends of said outer covering to ensure the fastening of said outer covering on said tubular part.

5. A sealed connection device according to claim 1, wherein said sealing means include a plurality of bands fixing said sleeve means onto the cable.

6. A sealed connection device according to claim 1, wherein said sealing means further include two stoppers provided respectively at the ends of said sleeve means, said sleeve means being fixed onto said two stoppers.

7. A sealed connection device according to claim 1, wherein said viscous liquid is under a pressure 1.5 times greater than the gaseous pressure in the cable.

8. A sealed connection device for a cable under gaseous pressure, including a covering enclosing a harness of electrically insulated conductors subjected to the pressure of an inert internal gas, said device comprising a first sleeve made of an elastomeric substance closely bound at both ends to the covering of said cable in surrounding relationship to a first bared zone of the cable and filled with a viscous chemically neutral liquid in contact with the conductors under an internal pressure greater than the gaseous pressure prevailing in the cable, characterized in that said device further comprises two stoppers formed by a second sleeve and a third sleeve made of solid resin, secured to the cable and enclosing a second bared zone and a third bared zone of the cable situated on either side of the first bared zone, respectively.

9. A sealed connection device according to claim 8, characterized in that the said first sleeve covers the adjacent edges of said second sleeve and said third sleeve, and a plurality of bands are provided about the ends of said first sleeve ensuring its connection to the cable through the edges of the said second and third sleeves.

* * * * *